Nov. 4, 1969  E. M. GALLE  3,476,195
LUBRICANT RELIEF VALVE FOR ROCK BITS
Filed Nov. 15, 1968  2 Sheets-Sheet 1

EDWARD M. GALLE
INVENTOR.

BY Roy H. Smith, Jr.
ATTORNEY

EDWARD M. GALLE
*INVENTOR.*

BY Roy H. Smith, Jr.
ATTORNEY

United States Patent Office 3,476,195
Patented Nov. 4, 1969

3,476,195
LUBRICANT RELIEF VALVE FOR ROCK BITS
Edward M. Galle, Houston, Tex., assignor to Hughes
Tool Company, Houston, Tex., a corporation of
Delaware
Continuation-in-part of application Ser. No. 723,645,
Mar. 29, 1968. This application Nov. 15, 1968, Ser.
No. 790,494
Int. Cl. E21b 9/08, 9/35
U.S. Cl. 175—228                                11 Claims

ABSTRACT OF THE DISCLOSURE

The invention resulted from the drilling of deep wells with lubricated rock bits equipped with efficient seals and also provided with flexible pressure compensators and vent holes to equalize the pressure between the lubricant within the bearing and the drilling fluid surrounding the bit. Experience with such bits indicated that some mechanism was causing the pressure within the bit to exceed the drilling fluid pressure. This internal overpressure was causing the compensator to be extruded into the vent hole, sometimes cutting it and causing a loss of lubricant or intrusion of drilling fluid and cuttings.

---

Figures 1, 2, 3:
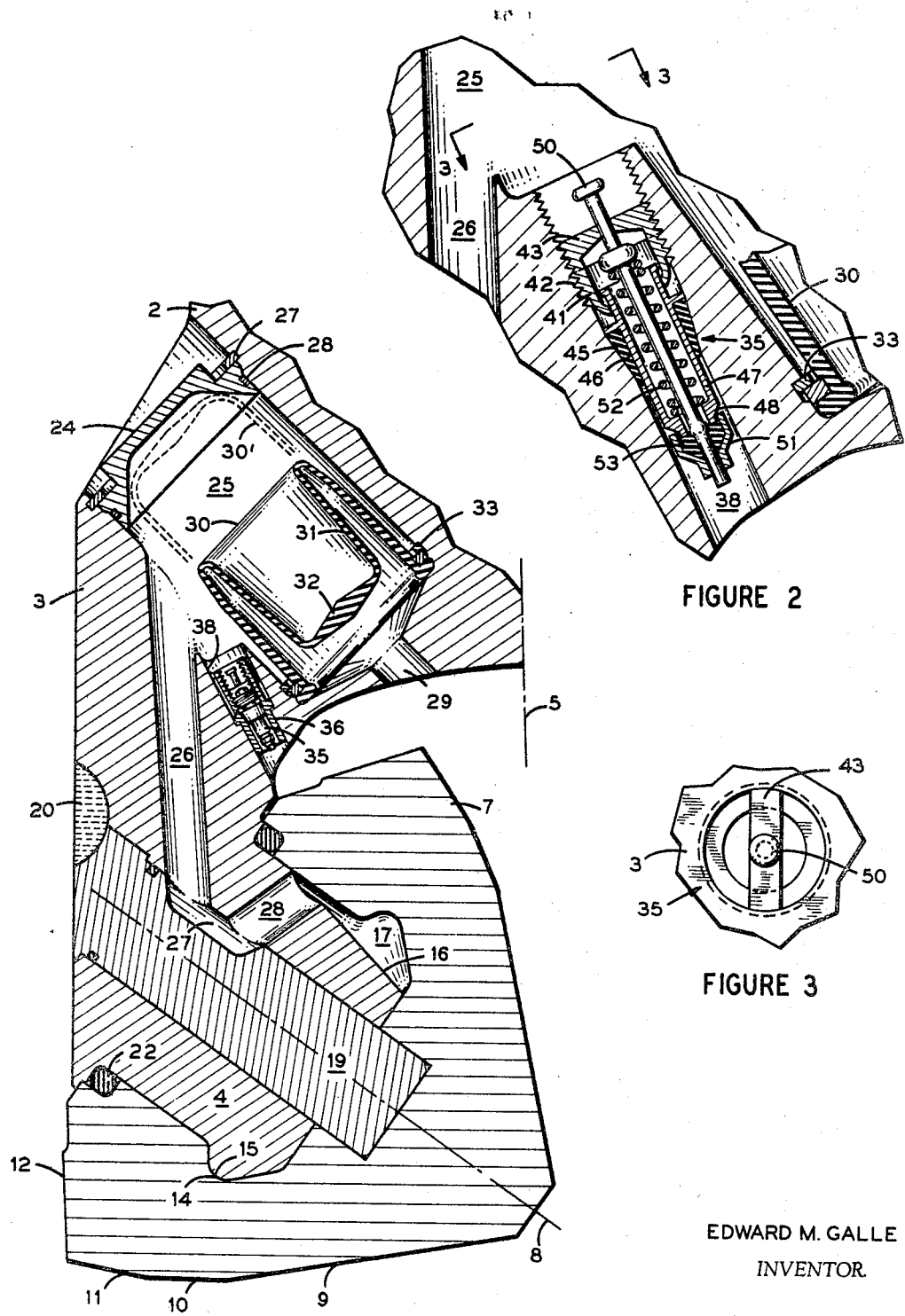

It was believed that the lubricant sometimes undergoes a partial cracking under the influence of the high local temperatures and pressures in the bearings, and that cracking or breakdown resulted in organic liquids and/or gases that caused the internal pressure build-up. The present inventor postulated that the compensator damage was occurring while the bit was rotating at the bottom of the hole, discarding the prevalent notion that it occurred while pulling the bit out of the hole through gradually decreasing external pressures. He concluded that a relief valve was necessary, and provided a check relief valve which operates at low pressures to permit flow out of the lubricant reservoir to the outside of the bit but blocks any flow in the reverse direction. The theory has been validated by field testing.

The exit port for the relief valve is preferably located closely adjacent the vent hole for the compensator, to avoid the effects of pressure differences between parts of the bit which can occur in pulling the bit or running it down into the hole, but may also be used successfully when spaced further from the vent hole. It is also useful when combined with compensators so structured that they cannot be damaged by being pushed against the vent hole, e.g., a compensator in the form of a sliding piston. When such a compensator can no longer function as a pressure equalizer, a continuing pressure build-up may cause the seals to be pushed out of place and damaged, a result avoided by the relief valves of the invention.

This application is a continuation-in-part of patent application 723,645, filed Mar. 29, 1968, now abandoned, which in turn is a continuation of application 558,082 filed June 16, 1966, now abandoned.

The present invention is concerned with rock bits and other earth penetrating tools, in particular those drilling tools designed for use at great depths below the surface of the earth. It represents a solution to a rather unobvious problem, a problem peculiar to earth drilling tools equipped with lubricating systems having both efficient seals and efficient compensating means to equalize the pressure on the mud side of the seal with the pressure on its lubricant side. Drilling tools so equipped are a relatively new development, as the rock bits which are still the standard of the drilling industry at this writing use mostly anti-friction bearings and are not so equipped. Earlier rock bits used only friction bearings and were provided with a petroleum type lubricant, but no satisfactory seals were kown in those early days and hence the need for the present invention was not manifest.

In the lubricated rock bits which have been commercially available for several years, the lubrication system includes a rubber-covered Belleville spring seal ring located at the backface of the rolling cutter and wiping against a pair of radially extending surfaces on the bit leg and the cutter. The lubricant volume includes all of the bearing space between the cutter and bearing pin, a lubricant reservoir in either the head of the bit or one of its legs, and appropriate passages connecting the reservoir with the bearing spaces between cutter and pin. The reservoir is filled with a lubricant, typically a high viscosity petroleum grease, and one end of the reservoir is closed with a compensator in the form of a resilient membrane, e.g., a folded rubber diaphragm. One very satisfactory compensator has approximately the shape of a cylindrical shell closed at one end and open at the other. The open end has an annular flange or bead which is sealingly secured to the wall of the reservoir, and the compensator is inverted or folded to its assembly position by pushing the closed end toward the open end to double the cylindrical wall back against itself. The wall unfolds as lubricant is consumed in service because the outside surface of the diaphragm, i.e., the surface not in contact with the lubricant, is vented to the outside of the bit. Since the compensator is flexible, it transmits the pressure of the fluid outside of the bit to the lubricant, thus providing the same pressure on the lubricant side of the seal as on the side exposed to the drilling mud or other drilling fluid.

Trouble has appeared, particularly when using very recent seal assemblies utilizing annular packings of various cross sections, e.g., O-rings. Such packings permit very little leakage under the seal, and the bits using them show a tendency for the compensator to be pushed backward through the vent hole. Frequently the closed end of the compensator has been ruptured by contact with the edge of the hole, permitting drilling fluid and cuttings to flow into the lubricant reservoir and mix with the lubricant. If this mixing were to be allowed to continue, the drilling fluid and cuttings would eventually displace all of the lubricant, thus insuring an early demise of the bearing structure, well before its appointed time.

This difficulty was not the result of thermal expansion of the lubricant brought about by downhole temperatures, which may be hundreds of degrees above surface temperature, as others took this fact into account and provided for it by incompleting filling the reservoir, thus leaving a space for expansion of the lubricant. The problem was more elusive, and the only certain observation was that the pressure in the bearing volume was building up higher than the downhole drilling fluid pressure by some unknown mechanism, not solely the result of thermal expansion brought about by the ambient downhole temperature.

Since the seal assembly was working with no appreciable leakage, the overpressure trouble could not have been the result of any substance flowing into the bearing volume, and therefore the undersigned inventor posited that the trouble must lie in the lubricant itself. Earlier work by his colleagues on the older sealed bits mentioned above had revealed an occasional instance of compensator rupture in which the lubricant remaining in the lubricant chamber was frothing because some sort of gas had become mixed in with it. Chemical analysis disclosed that this gas was a mixture of hydrocarbon products, principally methane, ethane and propane.

Since these gases had not been present in the lubricant chamber when the bit was run into the hole, and it appeared highly improbable that they could have gotten into the bit from the formation being drilled while the bit was on bottom, it was concluded that they must have come from the lubricant. Apparently the lubricant breaks down or cracks because of the very high temperatures it is exposed to at the bearing interface, the very high pressures at such interface, or a combination of both temperature and pressure. The lubricant undergoes changes similar to those involved in the distillation or cracking of crude petroleum, resulting in a multitude of organic compounds and mixtures, some gaseous, some liquid and some solid, the gases being particularly objectionable because of the larger volume they occupy. Although the process takes place in a rock bit at a very slow rate and apparently would never crack a major portion of the grease, it can and does take place to such an extent as to cause a serious overpressure problem.

The contribution of the present inventor lies not so much in the solution to a problem as in recognizing that there was a problem serious enough to require a solution. Others believed that the compensators were rupturing as the bit was being pulled out of the hole rather than while it was in use at the bottom of the hole, pointing out that the high bottom hole pressure would tend to keep the cracking gases compressed to a small volume and that the gases expand as the bit is pulled up through progressively lower pressure levels. If this were true, there would be little need for the present invention because a bit is ordinarily kept on bottom until fully worn and there is no problem if the compensator remains intact while the bit is operating.

The present inventor reached the opposite conclusion, that the compensators were being ruptured while the bit was rotating on bottom. This conclusion was premised on three mechanisms that could cause pressure buildup within the sealed bearing: (1) thermal expansion of the lubricant brought about by ambient downhole temperatures, (2) thermal expansion caused by bearing temperature rise due to bearing friction, and (3) the aforementioned increase in lubricant volume caused by cracking of the lubricant. The conclusion was supported by observations of worn bits in which the compensators had ruptured and permitted drilling fluid and cuttings to flow into the bearings; the bearings of some of these bits exhibited wear patterns which could only be accounted for by assuming that the compensators ruptured long before the bit was stopped. Some of these bits were also found to be filled with drilling fluid and empty of lubricant, a condition only likely to occur if the compensator has ruptured on bottom.

In addition, the present inventor recognized that an unobvious problem was created because of the markedly superior effectiveness of the packing ring seals mentioned above. Whereas the older Belleville spring type seals operate somewhat like check valves in permitting sufficient lubricant to leak under the seal so that ordinarily there is no pressure build-up within the lubricant volume, it has been the present inventor's observation that packings such as O-ring seals allow virtually no leakage, or at least so little that leakage past the O-ring cannot be relied on as a mechanism for pressure relief. Others seemed to be skeptical that such seals could be so effective in rock bits, but the present inventor was convinced that they were fully effective and contributed to the overpressure problem.

Once the problem was recognized, and the undersigned inventor is convinced that recognition of the problem is his real contribution, the solution was not difficult. Various means could have been adopted to prevent the compensator from blowing out through its vent hole, e.g., embedding a metal plate in the rubber cap or covering the vent with a fine mesh screen, but this solution was unattractive because it implied abandoning the design criterion of equal pressures on both sides of the seal, and in fact would have required a pressure drop over the seal which could easily have attained sufficient magnitude to extrude the seal into the fine gaps between cutter and bit head, where it would be quickly abraded. Equally unattractive was the possibility of increasing the expansion space in the lubricant chamber, as this would have further diminished the lubricant supplied in the reservoir. Furthermore, the space to be left unfilled could not be calculated with any show of exactness, as the temperature and pressure within the bearing vary considerably with the time the bit has been operating and also with the depth of the hole, and thus an expansion volume satisfactory for one set of circumstances would be inadequate under others.

The only solution found adequate for all depths was to equip the lubricant system with a one way vent, i.e., a low pressure relief valve disposed between the lubricant space in the reservoir and the space exposed to the fluid washing around the tool, such valve operating to keep drilling fluid and cuttings from flowing into the lubricant and permitting limited flow of lubricant out of the reservoir. With such a relief valve the reservoir may be completely packed with grease and there is no need to be concerned with volume measurements. The designer rests assured that there will be no excessive pressure drop over his seal, no matter what the operating conditions, and that there is adequate grease to keep his bearings lubricated throughout the life of the bit. When using such a valve he may also use alternative compensator structures of the type which cannot be forced through the vent, e.g., the aforementioned embedded metal plate or fine mesh screen arrangement, or even a compensator, in the form of a sliding piston. The designer can utilize such structures without concern that a high pressure build-up over the annulus pressure will damage his seals, because his relief valve will open at a low pressure to prevent any pressure differential from occurring which is great enough to cause such undesirable effect.

Figure 4:
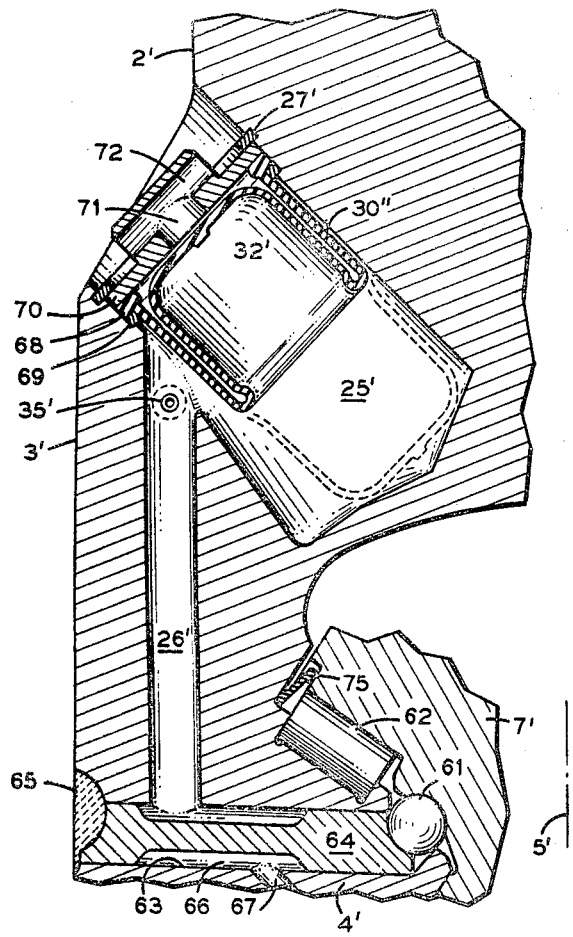
Figure 5:
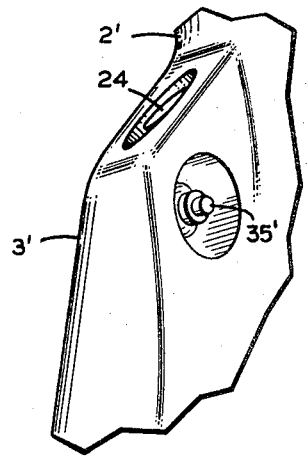

This solution is illustrated by a drawing attached to the present specification, and the reader will probably understand the application of the invention somewhat more clearly by examining such drawing in conjunction with the following description. In such drawing:

FIGURE 1 is a vertical section through one leg and cutter of a rolling cone rock bit containing a preferred embodiment of the invention, FIGURE 2 is an enlarged fragment of the part of FIGURE 1 containing the valve, the valve being enlarged and partially sectioned to show its working parts, FIGURE 3 is a top view of the valve shown in FIGURES 1 and 2, FIGURE 4 illustrates the application of the invention to a rolling cutter rock bit using anti-friction bearings and an end face seal, the view being a fragmentary vertical section through one leg of the bit, and FIGURE 5 is a fragmentary perspective view of the bit leg of FIGURE 4, illustrating the location of the valve in the leg.

The preferred embodiment shown in FIGURE 1 includes a part of bit head 2, the part not shown having the usual upstanding tapered and threaded hollow pin for connection to the lower end of a drill string, one of the depending bit legs 3, a bearing pin 4 integral with the leg and extending downwardly and inwardly toward the axis of rotation 5 of the bit, and rolling cutter 7 mounted on bearing pin 4 for rotation about the axis 8 of pin 4 as cutter 7 comes to rest on the bottom of a hole and the drill string is rotated about axis 5 while a part of its weight is applied to the bit. No cutting structure is shown on the cutter because it is not part of the present invention, but it is to be understood that suitable steel teeth are formed on conical surfaces 9, 10 and 11, and suitable hardfacing on gages surface 12, or that they are equipped with inserts of compacted sintered tungsten carbide with cutting tips protruding from such surfaces, as shown for instance in the U.S. patents of Morland, Woods and Scott, 2,687,875; Cunningham, 2,774,570; Morlan, 2,774,571, and other issued and pending patents.

The bearing pin 4 shown in this figure is one embodiment of an invention of the undersigned more fully described in his copending United States application S.N. 496,248, filed Oct. 7, 1965, now U.S. Patent 3,361,494. It provides an entirely friction journal bearing wherein the cutter is prevented from moving axially on the bearing pin by a lip 14 on the pin extending into an annular groove 15 in the cutter. The bearing has been relieved on its non-pressure side to define a relieved surface 16 and a gap 17, the relief preferably being just enough to permit the cutter to be slipped over the lip 14 while its bearing surface is slid along relieved surface 16 until groove 15 approximately registers with the lip, after which the cutter is canted to seat the lip in the groove and bring the axes of the two members into coincidence. The assembly is then completed by inserting a locking plug 19 into the indicated registering openings in leg, pin and cutter, and securing it in place by weldment 20. Plug 19 prevents the cutter from being cocked in the reverse direction from that needed to assemble it, and must be withdrawn before the assembly can be taken apart.

The seal 22 is an O-ring seated in the indicated counterbored recess in the backface of cutter 7, and bears against bearing pin 4 adjacent its intersection with bit leg 3. It is preferably formed of an oil resistant synthetic rubber or plastic material of siutable durometer hardness, as set forth in more detail in the co-pending application of the undersigned inventor S.N. 506,654, filed Nov. 8, 1965, now United States Patent 3,397,928. The reader is also referred to this patent for more details concerning the extent to which the cross section of seal ring 22 is compressed in assembling it on the bit. This is an important consideration in obtaining an effective seal, but it is sufficient here to observe that the compression of the O-ring must be greater than that recommended by manufacturers of O-rings for rotary applications.

Connecting the reservoir 25 in the bit head with gap 17 around bearing pin 4 are end-connected passages 26 in bit leg 3, 27 in locking plug 19, and 28 in bearing pin 4. The upper end of the reservoir is closed with a solid cap 24, secured in place by a split snap ring 27 engaging the indicated groove in the bit head and provided with a seal ring 28, but the lower end is vented to the environment by vent hole 29. Compensator 30 is secured to the wall of reservoir 25 by the engagement of a split snap ring 33 in another annular groove in the reservoir wall. The compensator is shown in solid lines in its assembly condition, with wall 31 folded back on itself by pushing end 32 toward the vent hole 29, and in dotted lines 30' in the unfolded position it occupies after most of the grease has been used up. This compensator arrangement is similar to those disclosed in the United States Patents to Eenink, 3,007,751, and Cunningham, 3,007,750 and 3,137,508, any of which are suitable for the present invention.

The valve 35 of the invention herein disclosed is threadedly seated in a housing 36 brazed or otherwise secured in an opening 38 extending from reservoir 25 to the outside of the bit. As more fully shown in FIGURES 2 and 3, wherein the same valve 35 is shown threaded directly to the wall of passage 38 without the use of a housing, the valve is an ordinary tire valve commonly used in automobile tires and bicycle tires. It consists essentially of a tubular body 41 having an externally threaded upper end 42 including a portion 43 cut away for gripping by a mounting tool, a tapered midsection 45 equipped with an annular seal 46 in the form of conical shell of rubber, and a cylindrical shell lower portion 47 terminating in a small conical section 48. A valve stem 50 of smaller diameter than the axial passage through the body extends completely through the body and has a solid cup 51 firmly attached to its lower end. The upper end of cup 51 contains a recess shaped to form a seat for the conical lower end 48 of the valve body, and an annular rubber member 53 is mounted in this recess to insure a seal as cup 51 is pulled upwardly against end 48 of the body. Such pulling action is provided by compression spring 52, mounted with its lower end bearing against the indicated inturned flange of the valve body and its upper end bearing against the illustrated knot on valve stem 50.

The valve 35 just described is a check relieve valve which opens at a pressure differential of 15 to 35 p.s.i., and operates effectively to relieve a pressure build-up in reservoir 25 above this value. The closed end 32 of compensator 30 may be slightly thickened at its center, as illustrated, to insure that the valve will operate before the closed end is pushed through vent hole 29. The particular form and type of valve is not critical, so long as it is a low pressure relief valve connected between the lubricant and the outside environment to permit flow to the ouside and block reverse flow.

The preferred location of the valve is of some importance, and it may have the alternate preferred disposition of valve 35' depicted schematically in FIGURES 4 and 5 when the compensator is disposed as shown therein. The bit shown in these figures differs from the preferred embodiment in having a bearing structure utilizing antifriction balls and rollers 61 and 62 rolling in the indicated registering raceways in bearing pin 4' and cutter 7', the balls being loaded through opening 63 to serve as a locking means and being secured in their raceway by ball plug 64 and weld 65. Lubricant flows to the bearing from reservoir 25' through the interconnected passages 26', 66 and 67, the latter extending through bearing pin 4', or from passage 66 through a passage not shown around the inner end of ball plug 64 to the raceway for balls 61, or both. The valve 35', which may be identical to the valve 35 of FIGURES 1–3, is preferably secured laterally in bit leg 3' so that the operating end extends into passage 26' and the cup end 51 is exposed to the drilling fluid in the annular space surrounding the bit.

For completeness, it may also be mentioned that compensator 30" is inverted by comparison with the FIGURES 1–3 embodiment, being secured at the open end of a reservoir 25' having the form of a blind opening by the use of the usual split snap ring 27' which not only secures the compensator in place by forcing its flange 68 and interbonded stiffening ring 69 against the indicated shoulder of the head but also secures vent cap 70 in place, this cap having appropriate openings 71 and 72 to expose the outer surface of compensator 32' to the pressure of the fluid outside of the bit.

The FIGURES 4–5 embodiment also has a face seal 75 sealing between the generally radially extending parallel surfaces of bit leg 3' and cutter 7', as is more fully disclosed in the U.S. patents of Atkinson, Cline and Cunningham, 3,075,781; Cunningham, 3,137,508; and Cunningham et al., 3,199,878, and also in the application of Farr and McElya, S.N. 317,276, filed Oct. 18, 1963, now U.S. Patent 3,313,552. Since these seal rings 75 designedly leak a small amount of lubricant under the outer lip of the ring and through the gap between the outer diameter of the seal and the adjacent axial surface of the cutter, they operate somewhat as check valves in themselves. Nevertheless, bits using such seals have sometimes shown the same overpressure problem and compensator damage, and they are benefited by being equipped with the relief valves of the present invention.

The reason for preferably locating the valve 35 or 35' as indicated in the drawing figures is to dispose the exit end of the valve as close as possible to an area of the bit surface where the mud pressure is equal to that at the vent 29 or 71 for the lubricant chamber, and the reason for so doing lies in the behavior of the system when the bit is being lowered into a hole or pulled from a hole. When "running it in" the pressure at the crotch of the bit, which includes the region of the vent 29 of FIGURE 1, may be temporarily somewhat higher than the pressure in the annulus around bit head 2, by perhaps as much as 100 p.s.i.

If the valve of FIGURE 1 were to be relocated to the position 35' of FIGURES 4–5, leaving the compensator and vent as shown in FIGURE 1, a substantial pressure difference would be applied over the valve and could cause it to open. Lubricant would be forced out, probably all of it if sufficient time is required to get the bit to the bottom of the hole. A similar reason dictates that the arrangement of FIGURE 4 should preferably not be varied by moving the valve to the crotch location of FIGURE 1 while leaving the lubricant chamber vented to the annulus as shown.

However, there are many dimensional variations in a drill string and many variations in the manner of using any given drill string. It cannot be said with any certainty that the aforementioned transient pressure differential between the annulus of the bit and the crotch volume between the big legs will be of sufficient magnitude to cause the valve to open if the exit port of the valve and the compensator vent open into these two different areas. A drill string is necessarily lowered or raised in steps, because after any short movement a pipe section or two or three pipe sections must be added or uncoupled at the surface, and drillers differ in the speed with which they allow the string to be lowered or raised. This speed is largely determinative of the build-up of the pressure differential, and other factors such as drill collar diameter and hole condition also play a part. If the drill collars are well spaced from the sidewall of the hole and the driller is relatively cautious in moving his string, no appreciable pressure differences may develop between different locations on the bit surface, and the valve exit port may be safely spaced well apart from the vent.

It is also desirable to provide some latitude for the rock bit designer and those responsible for fabricating the bits. The rock bit designer may find it more convenient to place the valve exit in the annulus and the compensator vent in the crotch, or vice-versa, and the manufacturer may find his tooling and operations problems reduced by locating these openings well apart from one another.

For the above reasons the valve exit and the compensator vent may be designedly provided in parts of the rock bit, or other parts of the complete drill string, which are not adjacent one another, and when such parts are likely to experience transient pressure differences in moving the bit axially in the hole the safer design is to provide a valve which opens at a somewhat higher pressure, e.g., 50 to 150 p.s.i.

Except for such precautions, the other elements illustrated may be varied considerably without departing from the present invention. The compensator of FIGURE 1 may be inverted to the position of FIGURE 4, the valve preferably also being relocated to the position of FIGURE 4, without affecting the operation of the lubricating system, and vice versa. The passage for the valve may obviously be formed in any part or component of the bit which separates the lubricant volume from the fluid-washed region outside of the bit, e.g., in the illustrated compensator, a sliding piston type compensator, or the like. The packing ring seal of FIGURE 1 may be replaced with the Belleville spring seal of FIGURE 4, although the latter is not as effective as a packing ring seal and the need for a relief valve is not so pronounced when using the Belleville spring seal, and vice versa, or by any other effective seal. In addition, it can be mentioned that the invention is independent of the type of bearing used in the rock bit, so that the bearings shown in the two illustrated embodiments may be switched around without affecting the operation of the invention.

The lubricant supply system, including the compensator, may also be varied from the specific form illustrated. Basically all that is required is a lubricant reservoir, which may be located either in the bit or in a storage sub in the drill string (as in Cunningham, U.S. Patent 3,007,750, for instance), a fluid flow channel connecting the reservoir with the bearings of the bit, a vent between the reservoir and the outer surface of the bit (or sub), and a compensator in the form of a flexible or movable member interposed between the vent and the lubricant within the reservoir. This member may be any effective membrane, piston or the like, fabricated and mounted to readily transmit the pressure of the fluid in the annulus to the lubricant stored in the reservoir.

In summary, it was found that compensators in sealed and pressure compensated lubrication systems of rock bits were being ruptured, and the cause of the trouble was isolated as a pressure build-up within the lubricant volume brought about by cracking and thermal expansion of the lubricant, apparently because in service in deep wells it is subjected to very high pressures and temperatures in the bearing. The present inventor recognized that this pressure build-up was not relieving itself past the seal because of the superior sealing ability of packing ring seals, and also recognized that the compensators were being ruptured while the bits were being operated at the bottom of the hole, rather than while the bit was being pulled through lower ambient pressures toward the surface. The only satisfactory solution to the problem was to vent the lubricant through a low pressure relief valve permitting outflow from the chamber to the outside of the bit but blocking reverse flow, using any available low pressure relief valve disposed in an appropriate passage in the bit or bit component extending between the outside of the bit and the lubricant volume within the bit, the outside end of such passage being located at any convenient part of the bit but preferably closely adjacent the vent hole for the lubricant compensator or in any other position where the pressure at all times is substantially the same as the pressure at the outer end of the vent hole.

What is claimed is:

1. In a drill string including as its lowermost member an earth penetrating tool having at least one bearing pin, a rolling cutter rotatably mounted on the bearing pin and defining therewith a bearing space having an end connected to the outside of the tool, a seal between the rolling cutter and the bearing pin in said bearing space, a lubricant reservoir in the drill string and a pressure compensator in the lubricant reservoir to separate it into a lubricant volume and a drilling fluid region, said lubricant volume being connected to said bearing space by internal passages in the drill string and said drilling fluid region being connected to the outside of the string by a vent, the improvement comprising a low pressure relief valve disposed to connect said lubricant volume with the space outside of the string, said valve being oriented to permit flow from within the string to the outside thereof and blocking flow in the reverse direction, whereby overpressure build-up in said bearing space may be relieved through said valve.

2. An improved rolling cutter drilling tool of the type having a seal between a rolling cutter and a bearing pin on which the cutter is rotatably mounted, a lubricant reservoir in the tool, channel means for feeding lubricant from the reservoir to the bearing, and a pressure compensator in said reservoir movable toward one end thereof to force lubricant into the channel and also movable toward the other end, said other end being connected by a vent to the outside of the tool, together with a low pressure relief valve disposed in a passage flow connecting the lubricant reservoir and the outside of the tool, said valve being operable to permit flow from the lubricant reservoir to the outside of the tool and blocking any reverse flow.

3. The improved drilling tool of claim 2 in which the termination of said valve passage on the outside of the tool is located in a portion of the tool surface which is exposed at all times to substantially the same external pressure as that existing at said vent.

4. An improved lubricating system for a rolling cutter rock bit which includes a packing ring seal between at least one of the rolling cutters and the bearing pins on which the cutters are rotatably mounted, a lubricant chamber in the bit divided into a lubricant region and a second region by a flexible pressure compensator secured in said chamber and extensible between an initial unexpanded disposition and an expanded disposition as the lubricant is used up, a vent passage in the bit from the outside thereof to the second region of the lubricant chamber, and a lubricant passage in the bit connecting the lubricant region with the bearing space between the rolling cutter and the bearing pin on which it is mounted, together with a relief valve secured in a passage flow connecting the lubricant region with the second region, said valve being disposed to permit flow only outwardly from said lubricant region.

5. The improved lubrication system of claim 4 in which the passage for said relief valve has an exit port to the outer surface of the bit which lies closely adjacent said compensator vent.

6. In a rolling cutter drilling tool which includes a seal between at least one of the rolling cutters and the bearing pins or shafts on which the cutters are mounted, a lubricant volume comprising a reservoir and a passage connecting such reservoir to the bearing between such rolling cutter and its bearing pin, and also includes a pressure compensator in the lubricant reservoir disposed to separate the reservoir into a lubricant region and a drilling fluid region, such drilling fluid region being connected to a vent passage through the bit and terminating on its outer surface, the improvement comprising a passage flow connecting the lubricant and drilling fluid regions and having an entry port terminating in said lubricant volume and an exit port terminating in an area exposed to the fluid washing the outer surface of the bit, and a low pressure relief valve secured in said passage and oriented to permit fluid flow only outwardly from the lubricant volume to the outside of the bit.

7. The improved rolling cutter drilling tool of claim 6 in which said exit port of the relief valve passage and the outer terminus of the compensator vent lie in or adjacent the crotch region of the bit.

8. The improved rolling cutter drilling tool of claim 6 in which said exit port of the relief valve passage and the outer terminus of the compensator vent lie in or adjacent the exterior portion of the bit exposed to the annulus lying between the bit and the sidewall of a hole formed by the bit.

9. The improved rolling cutter drilling tool of claim 6 in which said exit port of the relief valve passage and the outer terminus of the compensator vent lie in or adjacent the same outer surface portion of the bit.

10. The improved rolling cutter drilling tool of claim 6 in which said exit port of the relief valve passage and the outer terminus of the compensator vent lie closely adjacent one another, whereby they are at all times exposed to substantially the same exterior pressure.

11. In an earth penetrating tool having at least one bearing pin, a rolling cutter rotatably mounted on the bearing pin and defining therewith a bearing space having an end connected to the outside of the tool, a seal between the rolling cutter and the bearing pin at said end of the bearing space, a lubricant reservoir in the tool, and a flexible pressure compensator sealingly secured to the wall of the lubricant reservoir to separate it into a lubricant volume and a drilling fluid region, said lubricant volume being connected to said bearing space by internal passages in the tool and said drilling fluid region being connected to the outside of the tool by a vent, the improvement comprising an opening in said earth penetrating tool extending directly between said lubricant volume and the outside of the tool, and a low pressure relief valve disposed in said opening, said valve being oriented to permit flow from within the tool to the outside thereof and blocking flow in the reverse direction, said opening terminating outside the tool at a location exposed at all times to substantially the same pressure as the pressure at said vent, whereby overpressure build-up in said bearing space may be relieved through said valve.

References Cited
UNITED STATES PATENTS

| | | | |
|---|---|---|---|
| 3,007,750 | 11/1961 | Cunningham | 175—227 X |
| 3,007,751 | 11/1961 | Eenink | 175—227 X |
| 3,048,230 | 8/1962 | Angel | 175—228 |
| 3,230,020 | 1/1966 | Gilbert | 175—228 X |
| 3,251,634 | 5/1966 | Dareing | 175—228 X |
| 3,303,898 | 2/1967 | Bercaru | 175—228 |

NILE C. BYERS, JR., Primary Examiner

UNITED STATES PATENT OFFICE
CERTIFICATE OF CORRECTION

Patent No. 3,476,195                                       November 4, 1969

Edward M. Galle

It is certified that error appears in the above identified patent and that said Letters Patent are hereby corrected as shown below:

Column 1, line 25, cancel the heavy line and insert the same after line 55, same column 1.

Signed and sealed this 1st day of September 1970.

(SEAL)
Attest:

Edward M. Fletcher, Jr.                          WILLIAM E. SCHUYLER, JR.
Attesting Officer                                     Commissioner of Patents